United States Patent
Yang et al.

(10) Patent No.: US 12,228,204 B2
(45) Date of Patent: Feb. 18, 2025

(54) FLEXIBLE MECHANISM-BASED ANTI-BACKLASH DEVICE FOR PLANETARY GEAR TRAIN, GEARBOX AND ROBOT JOINT

(71) Applicant: NINGBO INSTITUTE OF MATERIALS TECHNOLOGY & ENGINEERING, CHINESE ACADEMY OF SCIENCES, Ningbo (CN)

(72) Inventors: Guilin Yang, Ningbo (CN); Qinghao Du, Ningbo (CN); Miao Yang, Ningbo (CN); Hongtao Yu, Ningbo (CN); Chi Zhang, Ningbo (CN); Chin Yin Chen, Ningbo (CN)

(73) Assignee: NINGBO INSTITUTE OF MATERIALS TECHNOLOGY & ENGINEERING, CHINESE ACADEMY OF SCIENCES, Ningbo (CN)

(*) Notice: Subject to any disclaimer, the term of this patent is extended or adjusted under 35 U.S.C. 154(b) by 86 days.

(21) Appl. No.: 17/777,626

(22) PCT Filed: Sep. 17, 2021

(86) PCT No.: PCT/CN2021/118905
§ 371 (c)(1),
(2) Date: Dec. 27, 2023

(87) PCT Pub. No.: WO2022/148058
PCT Pub. Date: Jul. 14, 2022

(65) Prior Publication Data
US 2024/0229925 A1 Jul. 11, 2024

(30) Foreign Application Priority Data
Jan. 8, 2021 (CN) .......................... 202110027717.5

(51) Int. Cl.
*F16H 57/12* (2006.01)
*F16H 57/08* (2006.01)

(52) U.S. Cl.
CPC ........... *F16H 57/12* (2013.01); *F16H 57/082* (2013.01)

(58) Field of Classification Search
CPC .. F16H 1/2836; F16H 2057/125; F16H 57/12; F16H 57/082; F16H 1/2863; F16H 1/32; F16H 57/021; F16H 57/023
See application file for complete search history.

(56) References Cited

U.S. PATENT DOCUMENTS 3,143,899 A * 8/1964 York .................... F16H 1/2863
475/347
2007/0179011 A1* 8/2007 Choi .................... F16H 1/2863
475/331

FOREIGN PATENT DOCUMENTS

CN 101502205 A 8/2009
CN 105156594 A 12/2015
(Continued)

*Primary Examiner* — Victor L Macarthur
(74) *Attorney, Agent, or Firm* — Bayramoglu Law Offices LLC

(57) ABSTRACT

A flexible mechanism-based anti-backlash device for a planetary gear train, a gearbox, and a robot joint are provided. The anti-backlash device includes an integrated flexible planet carrier, an adjusting screw and a spring, the integrated flexible planet carrier is provided with a moving platform, the moving platform is provided with a spring hole, and the spring is sleeved outside the screw and is installed in the spring hole; when the threaded connection depth of the adjusting screw and the integrated flexible planet carrier reaches or exceeds a set depth, the adjusting screw can extrude the spring to make the moving platform generate elastic movement along a radial direction of the integrated flexible planet carrier, and the radial elastic movement is (Continued)

transformed into circumferential elastic rotation of a planet carrier bearing hole around the center of the planet carrier through an elastic connector.

20 Claims, 3 Drawing Sheets

(56) References Cited

FOREIGN PATENT DOCUMENTS

| | | |
|---|---|---|
| CN | 105508585 A | 4/2016 |
| CN | 109882585 A | 6/2019 |
| CN | 110925409 A | 3/2020 |
| CN | 210196366 U | 3/2020 |
| CN | 112709788 A | 4/2021 |
| CN | 214367547 U | 10/2021 |

* cited by examiner

FLEXIBLE MECHANISM-BASED ANTI-BACKLASH DEVICE FOR PLANETARY GEAR TRAIN, GEARBOX AND ROBOT JOINT

CROSS REFERENCE TO RELATED APPLICATION

This application is the national phase entry of International Application No. PCT/CN2021/118905, filed on Sep. 17, 2021, which is based upon and claims priority to Chinese Patent Application No. 202110027717.5, filed on Jan. 8, 2021, the entire contents of which are incorporated herein by reference.

TECHNICAL FIELD

The present disclosure relates to a planetary gearbox, and in particular relates to a flexible mechanism-based anti-backlash device for a planetary gear train, a planetary gearbox, and a collaborative robot joint, belonging to the technical field of planetary gearboxes.

BACKGROUND

The gearbox is a core key component of a robot joint. A planetary gearbox has the advantages of high stiffness, high efficiency and excellent backdrivability compared with a harmonic gear drive gearbox used in the traditional robot joint, and has the advantages of small volume and light weight compared with a RV gearbox. A gearbox with a large reduction ratio and high drive efficiency suitable for the robot joint can be obtained by performing reasonable gear matching and efficiency optimization on the planetary gear train. However, due to the backlash in traditional gear drive during gear meshing, the drive of the gear may enter the dead zone of backlash when rotating reversely, which greatly affects the transmission precision. Therefore, the application of the planetary gearbox in precision drive scenarios such as robot joints faces great difficulties.

There are various methods for eliminating the gear backlash, such as an anti-backlash gear, a variable-tooth-thickness gear and double-motor anti-backlash technique are adopted. However, these methods are difficult to achieve in the planetary gearbox. For example, a mode of combining a fixed ring gear with a floating ring gear is adopted in CN110925409A to achieve backlash elimination by adjusting a relative angle of the two ring gears; and in CN105508585A, a main planet gear and an auxiliary planet gear are used to achieve double-side meshing to eliminate the backlash. In these methods, one or more redundant parts are added to achieve backlash elimination, which increases weight and rotational inertia of the gearbox, and then generates adverse influence on the dynamic performance of the gearbox.

How to provide an anti-backlash device which can eliminate gear backlash of the planetary gearbox and keep lightweight and compact is a problem urgent to be solved.

SUMMARY

A main objective of the present disclosure is to provide a flexible mechanism-based anti-backlash device for a planetary gear train, a gearbox, and a robot joint, thus overcoming the disadvantages in the prior art.

To achieve the objective of the present disclosure, the technical solution adopted by the present disclosure is as follows:

In one aspect of an embodiment of the present disclosure, a flexible mechanism-based anti-backlash device for a planetary gear train is provided, comprising an adjusting screw and a spring, wherein the adjusting screw is in threaded connection to an integrated flexible planet carrier, the integrated flexible planet carrier is provided with a moving platform, a spring hole is provided on the moving platform, and the spring is sleeved outside the screw and is installed in the spring hole; when the threaded connection depth of the adjusting screw and the integrated flexible planet carrier reaches or exceeds a set depth, the adjusting screw can extrude the spring to make the moving platform generate elastic movement along a radial direction of the integrated flexible planet carrier, thus making a planet gear shaft bearing hole in the integrated flexible planet carrier perform circumferential elastic rotation around the center of the integrated flexible planet carrier.

In some embodiments, the adjusting screw and the spring are both arranged along the radial direction of the integrated flexible planet carrier.

In some embodiments, one end of the spring is pressed against a bottom face of the spring hole, and the other end of the spring is pressed against a nut of the adjusting screw.

In some embodiments, the integrated flexible planet carrier comprises a first annular part, a plurality of second annular parts symmetrically arranged around the first annular part, and two moving platforms: the first annular part is provided with a planet carrier center shaft bearing hole, the second annular part is provided with a planet gear shaft bearing hole, the two moving platforms are distributed at two sides of the integrated flexible planet carrier, and each moving platform is arranged between two adjacent second annular parts; the first annular part is connected to each second annular part through a first elastic connector, and the moving platform is connected to the adjacent second annular part through a second elastic connector.

In some embodiments, the first annular part, the second annular part, the moving platform, the first elastic connector and the second elastic connector are all integrally provided.

In some embodiments, the number of the second annular parts is even.

In some embodiments, wherein the two adjacent second annular parts can rotate in pairs with respect to each other around the center of the integrated flexible planet carrier.

In some embodiments, the first elastic connector comprises a flexible leaf spring, and the second elastic connector comprises a first flexible hinge and a second flexible hinge connected in sequence.

Further, the moving platform is connected to the adjacent second annular part through the first flexible hinge and the second flexible hinge in sequence.

In some embodiments, radial stiffness of the planetary gear train anti-backlash device is:

$$K_L = \left[(2K_1)^{-1} + (2K_2)^{-1} + (2K_3)^{-1} + K_s^{-1}\right]^{-1}$$

Wherein $K_1$ is equivalent stiffness of the first flexible hinge in the radial direction of the integrated flexible planet carrier, $K_2$ is equivalent stiffness of the second flexible hinge in the radial direction of the integrated flexible planet carrier, $K_3$ is equivalent stiffness of the second annular part in the radial direction of the integrated flexible planet carrier when performing circumferential rotation through the first elastic connector, and $K_3$ is stiffness of the spring.

In the other aspect of the embodiment of the present disclosure, a gearbox is provided, comprising:
  a flexible mechanism-based anti-backlash device for a planetary gear train; and
  a sun gear and a plurality of planet gears which are arranged on an integrated flexible planet carrier, wherein the planet gears remain meshed with a ring gear and the sun gear.

In the other aspect of the embodiment of the present disclosure, a robot joint is provided, which comprises the gearbox.

Compared with the prior art, the technical solution provided by the embodiments of the present disclosure at least has the following beneficial effects:

(1) by designing an integrated flexible planet carrier, the planet gear shaft bearing hole can generate relative rotation around the center of the planet carrier without depending on additional and redundant parts, thus eliminating the gear backlash in forward and reverse directions in pairs;

(2) by providing a pre-load force adjusting mechanism on the integrated flexible planet carrier, the pre-load force born by the planet gear for backlash elimination can be adjusted to guarantee the reliable work of the anti-backlash device; and an anti-backlash state switching threshold of the planet gear can be adjusted by adjusting the pre-load force; when a load exceeds the threshold, a follow-up planet gear may overcome the stiffness of the anti-backlash device under the action of the torque of the follow-up planet gear around the center of the planetary wheel carrier to return to a normal same-side meshing state; and (3) the provided flexible mechanism-based anti-backlash device for the planetary gear train has the advantages of being integrated, lightweight, compact in structure, simple and reliable in principle, adjustable in pre-tightening force, and wide in application range.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
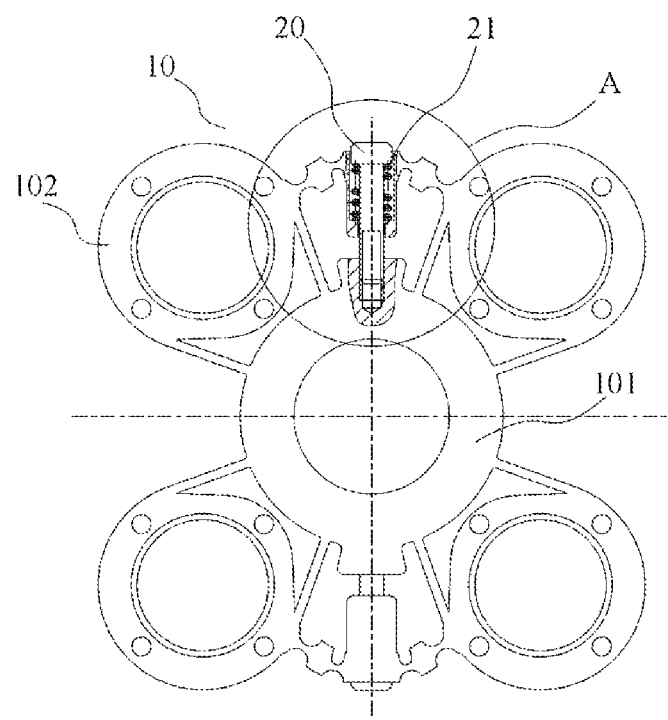
FIG. 1 is a diagram of an overall assembly structure of an anti-backlash device for a planetary gear train in an embodiment of the present disclosure.
Figure 2:
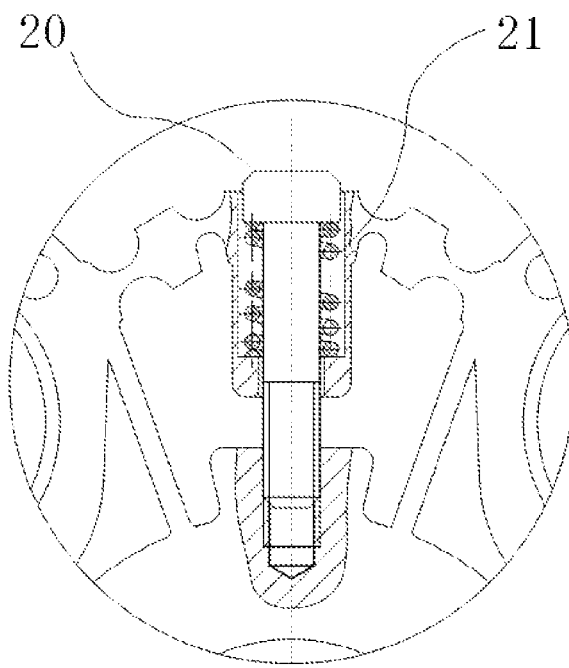
FIG. 2 is a partial enlarged view of a threaded connection position (a region illustrated by A in FIG. 1) of an anti-backlash device for a planetary gear train in an embodiment of the present disclosure.

In the drawings: 10-integrated flexible planet carrier; 101-first annular part; 102-second annular part; 11-flexible leaf spring; 12-planet gear shaft bearing hole; 13-moving platform; 14-first flexible hinge; 15-second flexible hinge; 16-planet carrier central shaft bearing hole; 20-adjusting screw; 21-spring; 30-ring gear; 31-planet gear shaft; 32-bearing gland.

DETAILED DESCRIPTION OF THE EMBODIMENTS

The present disclosure will be understood more fully from the following specific embodiments, which should be read in conjunction with the accompanying drawings. Detailed embodiments of the present disclosure are disclosed herein; however, it should be understood that the disclosed embodiments are merely exemplary of the present application and that the present disclosure can be embodied in various ways. Therefore, specific functional details disclosed herein should not be construed as limitation, but only be construed as the basis of the claims and construed as a representative basis for teaching those skilled in the art to employ the present disclosure in a different way in virtually any suitable detailed embodiment.

Please referring to FIG. 1 to FIG. 4, a flexible mechanism-based anti-backlash device for a planetary gear train disclosed by an embodiment of the present disclosure comprises an adjusting screw 20 and a spring 21; the adjusting screw 20 is in threaded connection to an integrated flexible planet carrier 10, the integrated flexible planet carrier 10 is provided with a moving platform 13, a spring hole is provided on the moving platform 13, and the spring 21 is sleeved outside the screw 20 and is installed in the spring hole; and one end of the spring 21 is pressed against a bottom face of the spring hole, and the other end of the spring is pressed against a nut of the adjusting screw 20. The adjusting screw 20 and the spring 21 are both arranged along a radial direction of the integrated flexible planet carrier 10. The threaded connection depth of the adjusting screw 20 and the integrated flexible planet carrier 10 can be directly adjusted through the adjusting screw 20.

Further, by adjusting the threaded connection depth of the adjusting screw 20 and the integrated flexible planet carrier 10, the adjusting screw extrudes the spring 21 to deform and then transmits the pressure to the moving platform 13 of the planet carrier 10, thus making the moving platform generate elastic movement along the radial direction of the planet carrier 10, and then making a planet gear shaft bearing hole in the integrated flexible planet carrier perform circumferential elastic rotate around the center of the integrated flexible planet carrier.

Further, the integrated flexible planet carrier 10 comprises a first annular part 101, a plurality of second annular parts 102 symmetrically arranged around the first annular part, and two moving platforms 13; the first annular part is provided with a planet carrier central shaft bearing hole 16, the second annular part is provided with a planet gear shaft bearing hole 12, the two moving platforms 13 are distributed at two sides of the integrated flexible planet carrier 10, and each moving platform 13 is arranged between two adjacent second annular parts 102; the first annular part 101 is connected to each second annular part 102 through a first elastic connector, and the moving platform 13 is connected to the adjacent second annular part 102 through a second elastic connector. Wherein the number of the second annular parts 102 is even. The first elastic connector is a flexible leaf spring 11, the second elastic connector comprises a first flexible hinge 14 and a second flexible hinge 15 connected in sequence, and the moving platform 13 is connected to the adjacent second annular part 102 through the first flexible hinge 14 and the second flexible hinge 15 in sequence.

Wherein the first annular part, the second annular part, the moving platform, the first elastic connector and the second elastic connector are all integrally provided.

By adopting the above structure design, the integrated flexible planet carrier 10 can transform circumferential stiffness of each planet gear shaft bearing hole 12 around the center of the planet carrier 10 into radial stiffness of the moving platform 13 in a vertical direction through the flexible hinges 14 and 15, and meanwhile, each planet gear shaft bearing hole 12 can generate elastic rotation around the center of the planet carrier 10 through the flexible leaf spring 11, and the moving platform 13 can generate elastic movement along the radial direction of the planet carrier 10 through the flexible hinges 14 and 15.

Further, radial stiffness of the planetary gear train anti-backlash device is:

$$K_L = \left[ (2K_1)^{-1} + (2K_2)^{-1} + (2K_3)^{-1} + K_s^{-1} \right]^{-1}$$

wherein $K_1$ is equivalent stiffness of the first flexible hinge 14 in the radial direction of the integrated flexible planet carrier 10, $K_2$ is equivalent stiffness of the second flexible hinge 15 in the radial direction of the integrated flexible planet carrier 10, $K_3$ is equivalent stiffness of the second annular part 102 in the radial direction of the integrated flexible planet carrier 10 when performing circumferential rotation through the first elastic connector, and $K_3$ is stiffness of the spring 21.

Figure 3:
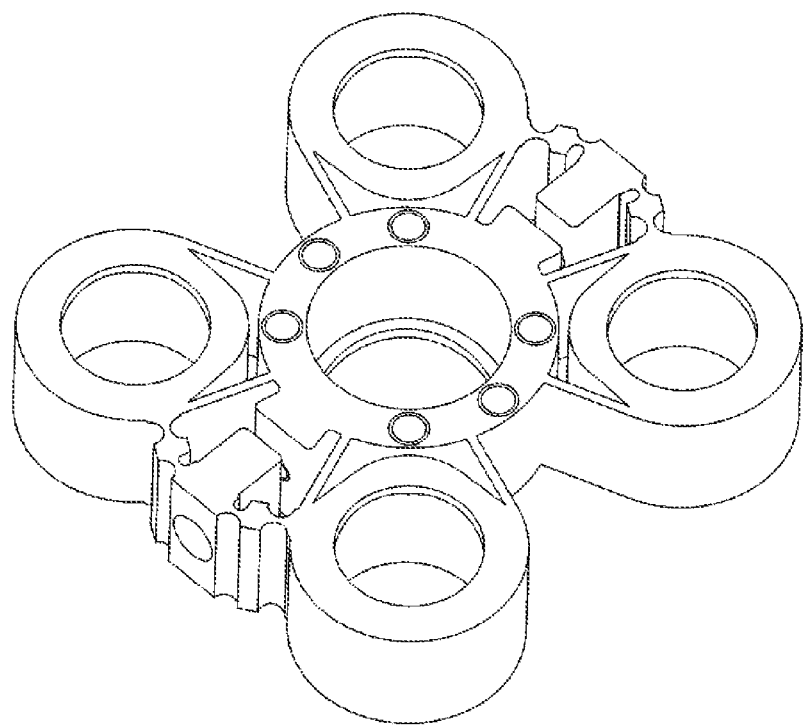
FIG. 3 is a three-dimensional diagram of an integrated flexible planet carrier in an embodiment of the present disclosure.
Figure 4:
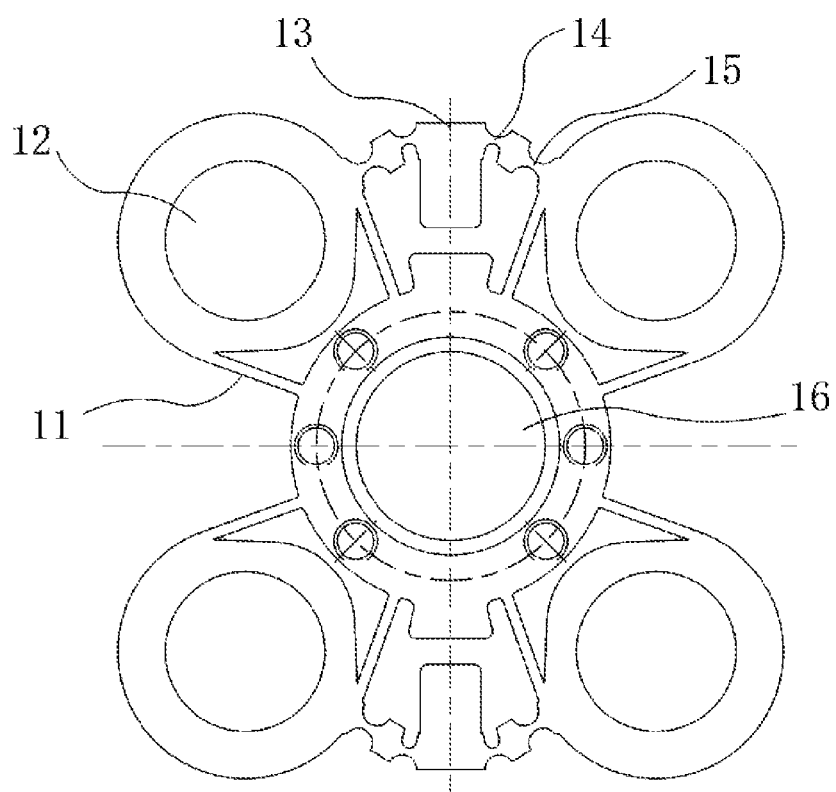
FIG. 4 is a front view of an integrated flexible planet carrier in an embodiment of the present disclosure.

More intuitively, please referring to FIG. 3 to FIG. 4, the integrated flexible planet carrier 10 can transform the elastic movement of the moving platform 13 in the radial direction into the circumferential elastic rotation of the planet gear shaft bearing hole 12 around the center of the planet carrier through the flexible leaf spring 11, the first flexible hinge 14 and the second flexible hinge 15, and can remain a certain restoring force during this process.

Figure 5:
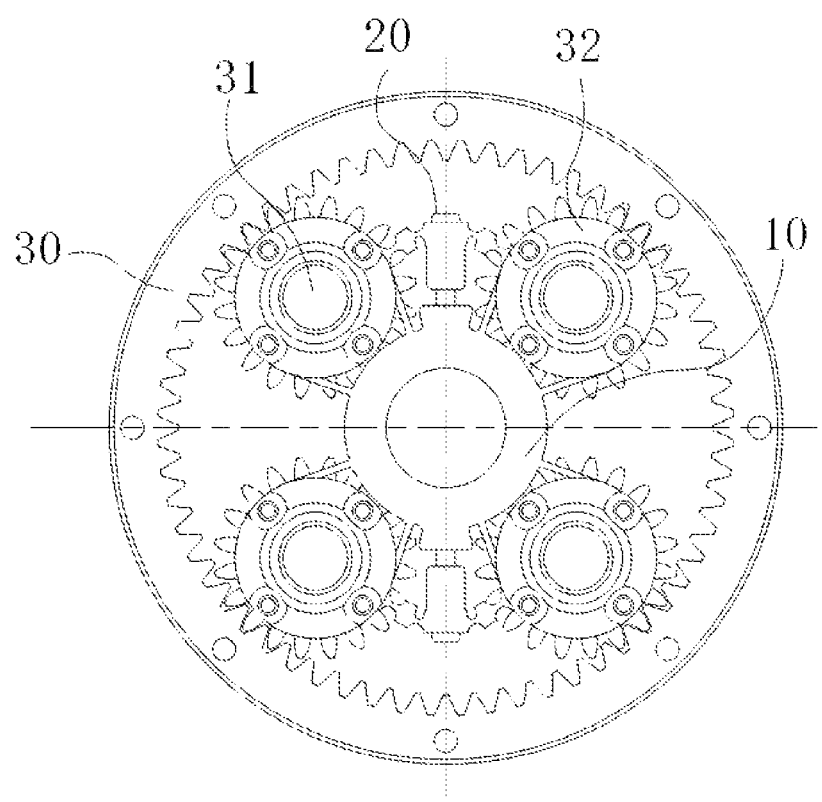
FIG. 5 is a diagram of a planetary gear train anti-backlash device in an embodiment of the present disclosure operating in an example gear train.

In this embodiment, the planetary gear train anti-backlash device can be connected to a planetary shaft bearing (not shown in figure) and the planet carrier central shaft bearing (not shown in figure) in a plurality of planetary gear trains, thus supporting the planet gear shaft (not shown in figure) to perform rotational motion. FIG. 5 is an application of the planetary gear train anti-backlash device in an example gear train. The planetary gear train is a 3K planetary gear train, wherein even number of planet gears are employed, and the planet carrier is not used as a part for transmitting a torque in a driving chain. In accordance with the planetary gear train anti-backlash device, the adjusting screw 20 is used to adjust the threaded connection depth with the integrated flexible planet carrier 10, and then extrudes the spring 21 to drive the moving platform 13 of the planet carrier to make the planet carrier 10 generate radial deformation; the radial deformation of the planet carrier is transformed into the rotation of the planet gear shaft bearing hole 12 around the center of the planet carrier through the flexible mechanism, thus driving two adjacent planet gear shafts 31 to generate reverse motion; and then a pair of adjacent planet gears remain meshed with a ring gear 30 and a sun gear (not shown in figure) at opposite side; the threaded connection depth of the adjusting screw 20 and the integrated flexible planet carrier 10 is continuously adjusted after the backlash elimination is finished to further compress the spring 21, and at the moment, as the gear backlash has been eliminated, the planet carrier 10 no longer generate the elastic deformation, the deformation force of the spring 21 is transformed into a pre-load force applied to a meshing face of the planet gear to achieve the tight attachment of the gear face; it is guaranteed that there is always a planet gear in a meshing state when the planetary gear train operates in the forward and reverse directions, i.e., the backlash elimination of the planet gear is achieved.

Therefore, a planetary gearbox can be constructed by applying the anti-backlash device for the planetary gear train of this embodiment. Moreover, the planetary gearbox can be applied to various fields.

For example, in an application case, the planetary gearbox provided with the anti-backlash device for the planetary gear train can be used in a drive gearbox of a collaborative robot joint to drive the collaborative robot with high human-robot interaction performance.

Various aspects, embodiments, features, and examples of the present disclosure should be considered illustrative in all respects and are not intended to limit the present disclosure, and the scope of the present disclosure is defined only by the claims. Other embodiments, modifications and use will be apparent to those skilled in the art without departing from the claimed spirit and scope of the present disclosure.

The use of headings and chapters in the case of the present disclosure is not meant to limit the present disclosure; each chapter may be applied to any aspect, embodiment, or feature of the present disclosure.

Unless otherwise specifically stated, the use of the terms "include, includes, including", "have, has or having" is generally understood to be open-ended and unlimited.

Although the present disclosure has been described with reference to illustrative embodiments, it will be understood by those skilled in the art that various other changes, omissions and/or additions may be made and the elements of the embodiment can be replaced with substantial equivalents without departing from the spirit and scope of the present disclosure. In addition, various modifications may be made without departing from the scope of the present disclosure so as to make specific conditions or materials adapt to the teaching of the present disclosure. Therefore, it is not intended herein to limit the present disclosure to the particular embodiments disclosed for executing the present disclosure, but rather it is intended to make the present disclosure encompass all embodiments that fall within the scope of the appended claims. Moreover, unless specifically stated, any use of the terms "first", "second" does not denote any sequence or importance, but rather the terms "first", "second" are used to distinguish one element from another.

What is claimed is:

1. A flexible mechanism-based anti-backlash device for a planetary gear train, comprising an integrated flexible planet carrier, an adjusting screw and a spring, wherein the adjusting screw is in threaded connection to the integrated flexible planet carrier, the integrated flexible planet carrier is provided with a moving platform, a spring hole is provided on the moving platform, and the spring is sleeved outside the screw and is installed in the spring hole; when a threaded connection depth of the adjusting screw and the integrated flexible planet carrier reaches or exceeds a set depth, the adjusting screw is configured to extrude the spring to allow the moving platform to generate elastic movement along a radial direction of the integrated flexible planet carrier, wherein a planet gear shaft bearing hole in the integrated flexible planet carrier is allowed to generate circumferential elastic rotation around a center of the integrated flexible planet carrier.

2. The flexible mechanism-based anti-backlash device for the planetary gear train according to claim 1, wherein the integrated flexible planet carrier comprises a first annular part, a plurality of second annular parts symmetrically arranged around the first annular part, and two moving platforms; the first annular part is provided with a planet carrier central shaft bearing hole, each second annular part of the plurality of the second annular parts is provided with the planet gear shaft bearing hole, the two moving platforms are distributed at two sides of the integrated flexible planet carrier, and each moving platform of the two moving platforms is arranged between two adjacent second annular parts; the first annular part is connected to each second annular part through a first elastic connector, and each moving platform is connected to an adjacent second annular part through a second elastic connector.

3. The flexible mechanism-based anti-backlash device for the planetary gear train according to claim 2, wherein the first annular part, the plurality of second annular parts, the two moving platforms, the first elastic connector and the second elastic connector are integrally arranged.

4. The flexible mechanism-based anti-backlash device for the planetary gear train according to claim 3, wherein the first elastic connector comprises a flexible leaf spring, and the second elastic connector comprises a first flexible hinge and a second flexible hinge connected in sequence.

5. The flexible mechanism-based anti-backlash device for the planetary gear train according to claim 2, wherein a number of the plurality of second annular parts is even.

6. The flexible mechanism-based anti-backlash device for the planetary gear train according to claim 5, wherein two adjacent second annular parts are configured to relatively rotate in pairs around the center of the integrated flexible planet carrier.

7. The flexible mechanism-based anti-backlash device for the planetary gear train according to claim 6, wherein the first elastic connector comprises a flexible leaf spring, and the second elastic connector comprises a first flexible hinge and a second flexible hinge connected in sequence.

8. The flexible mechanism-based anti-backlash device for the planetary gear train according to claim 5, wherein the first elastic connector comprises a flexible leaf spring, and the second elastic connector comprises a first flexible hinge and a second flexible hinge connected in sequence.

9. The flexible mechanism-based anti-backlash device for the planetary gear train according to claim 2, wherein the adjusting screw and the spring are arranged along the radial direction of the integrated flexible planet carrier; and/or, a first end of the spring is pressed against a bottom face of the spring hole, a second end of the spring is pressed against a nut of the adjusting screw.

10. The flexible mechanism-based anti-backlash device for the planetary gear train according to claim 9, wherein the first elastic connector comprises a flexible leaf spring, and the second elastic connector comprises a first flexible hinge and a second flexible hinge connected in sequence.

11. The flexible mechanism-based anti-backlash device for the planetary gear train according to claim 2, wherein the first elastic connector comprises a flexible leaf spring, and the second elastic connector comprises a first flexible hinge and a second flexible hinge connected in sequence.

12. The flexible mechanism-based anti-backlash device for the planetary gear train according to claim 11, wherein radial stiffness of the flexible mechanism-based anti-backlash device for the planetary gear train is:

$$K_L = \left[(2K_1)^{-1} + (2K_2)^{-1} + (2K_3)^{-1} + K_s^{-1}\right]^{-1}$$

wherein $K_1$ is equivalent stiffness of the first flexible hinge in the radial direction of the integrated flexible planet carrier, $K_2$ is equivalent stiffness of the second flexible hinge in the radial direction of the integrated flexible planet carrier, $K_3$ is equivalent stiffness of the each second annular part in the radial direction of the integrated flexible planet carrier when performing circumferential rotation through the first elastic connector, and $K_2$ is stiffness of the spring.

13. A gearbox, comprising:
the flexible mechanism-based anti-backlash device for the planetary gear train according to claim 1;
a sun gear; and
a plurality of planet gears;
wherein the sun gear and the plurality of planet gears are arranged on the integrated flexible planet carrier, wherein the plurality of planet gears remain meshed with a ring gear and the sun gear.

14. A robot joint, comprising the gearbox according to claim 13.

15. The gearbox according to claim 13, wherein the integrated flexible planet carrier comprises a first annular part, a plurality of second annular parts symmetrically arranged around the first annular part, and two moving platforms; the first annular part is provided with a planet carrier central shaft bearing hole, each second annular part of the plurality of the second annular parts is provided with the planet gear shaft bearing hole, the two moving platforms are distributed at two sides of the integrated flexible planet carrier, and each moving platform of the two moving platforms is arranged between two adjacent second annular parts; the first annular part is connected to each second annular part through a first elastic connector, and each moving platform is connected to an adjacent second annular part through a second elastic connector.

16. The gearbox according to claim 15, wherein the first annular part, the plurality of second annular parts, the two moving platforms, the first elastic connector and the second elastic connector are integrally arranged.

17. The gearbox according to claim 15, wherein a number of the plurality of second annular parts is even.

18. The gearbox according to claim 17, wherein two adjacent second annular parts are configured to relatively rotate in pairs around the center of the integrated flexible planet carrier.

19. The gearbox according to claim 15, wherein the adjusting screw and the spring are arranged along the radial direction of the integrated flexible planet carrier; and/or, a first end of the spring is pressed against a bottom face of the spring hole, a second end of the spring is pressed against a nut of the adjusting screw.

20. The gearbox according to claim 15, wherein the first elastic connector comprises a flexible leaf spring, and the second elastic connector comprises a first flexible hinge and a second flexible hinge connected in sequence.

\* \* \* \* \*